(12) United States Patent
Hagita et al.

(10) Patent No.: US 10,138,879 B2
(45) Date of Patent: Nov. 27, 2018

(54) HOUSING AND METHOD OF MANUFACTURING THE SAME

(71) Applicant: MITSUBISHI HEAVY INDUSTRIES THERMAL SYSTEMS, LTD., Minato-ku, Tokyo (JP)

(72) Inventors: Takayuki Hagita, Aichi (JP); Masaki Kawasaki, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 429 days.

(21) Appl. No.: 14/770,735

(22) PCT Filed: Apr. 3, 2014

(86) PCT No.: PCT/JP2014/059895
§ 371 (c)(1),
(2) Date: Aug. 26, 2015

(87) PCT Pub. No.: WO2014/175037
PCT Pub. Date: Oct. 30, 2014

(65) Prior Publication Data
US 2016/0010633 A1 Jan. 14, 2016

(30) Foreign Application Priority Data
Apr. 23, 2013 (JP) .................................. 2013-090452

(51) Int. Cl.
*F04B 39/12* (2006.01)
*F04B 39/14* (2006.01)
(Continued)

(52) U.S. Cl.
CPC .............. *F04B 39/14* (2013.01); *B23B 31/02* (2013.01); *F01C 21/10* (2013.01); *F04B 39/121* (2013.01);
(Continued)

(58) Field of Classification Search
CPC .............. F04C 2240/30; F04C 2230/85; F04C 2230/00; F04C 2230/604; F01C 21/10;
(Continued)

(56) References Cited

U.S. PATENT DOCUMENTS 5,314,317 A * 5/1994 Abe ........................ B23B 31/19
279/123
6,289,776 B1 9/2001 Altstadt et al.
7,806,712 B2 * 10/2010 Negishi ................... F04B 35/04
439/281

FOREIGN PATENT DOCUMENTS

CN 1083181 A 3/1994
CN 101268277 A 9/2008
(Continued)

OTHER PUBLICATIONS

Office Action dated Jun. 29, 2016 in corresponding Chinese Application No. 201480016602.4 with an English Translation.

*Primary Examiner* — Sarang Afzali
*Assistant Examiner* — Ruth G Hidalgo-Hernandez
(74) *Attorney, Agent, or Firm* — Birch, Stewart, Kolasch & Birch, LLP.

(57) ABSTRACT

This housing is a cylindrical housing including a bearing-member mounting portion provided at least one position on the inner circumferential surface, on which bearing-member mounting portion a bearing member is mounted; mounting legs provided at least two vertical positions on the outer circumferential surface; and chucking portions to be chucked by a chuck mechanism of a machining apparatus during machining, provided on the outer circumferential surface, at least three positions in the circumferential direction, corresponding to the position where the bearing-member mounting portion is provided.

8 Claims, 6 Drawing Sheets

(51) Int. Cl.
  *B23B 31/02*  (2006.01)
  *F01C 21/10*  (2006.01)
  *B23B 31/16*  (2006.01)
(52) U.S. Cl.
  CPC ........... *B23B 31/16* (2013.01); *F04C 2230/00* (2013.01); *F04C 2230/604* (2013.01); *F04C 2230/85* (2013.01); *F04C 2240/30* (2013.01); *Y10T 29/49323* (2015.01)
(58) Field of Classification Search
  CPC ....... B23B 31/02; B23B 31/16; F04B 39/121; F04B 39/14; Y10T 29/49359
  See application file for complete search history.

(56) References Cited

FOREIGN PATENT DOCUMENTS

| | | |
|---|---|---|
| CN | 101356366 A | 1/2009 |
| DE | 103 51 372 A1 | 6/2005 |
| JP | 59-179462 U | 11/1984 |
| JP | 6-712 A | 1/1994 |
| JP | 2686742 B2 | 12/1997 |
| JP | 3569044 B2 | 12/1997 |
| JP | 11-123604 A | 5/1999 |
| JP | 2003-120554 A | 4/2003 |
| JP | 2006-322385 A | 11/2006 |

\* cited by examiner

HOUSING AND METHOD OF MANUFACTURING THE SAME

TECHNICAL FIELD

The present invention relates to a cylindrical housing for an electric compressor or the like and to a method of manufacturing the same.

BACKGROUND ART

An electric compressor has a cylindrical housing that accommodates a compression mechanism and a motor for driving the compression mechanism. Various devices having a cylindrical housing have been provided. For example, PTL 1 discloses a flanged-type motor having a flanged bearing bracket on the load side. Furthermore, PTL 2 discloses a vane pump having a pump housing. Furthermore, PTL 3 discloses a screw compressor (fluid machine) having a hollow screw rotor.

With regard to these patent literatures, PTL 1 discloses a configuration for machining a flange face of the bearing bracket, in which trapezoidal chucking bases projecting in a belt-like shape along the axial direction are provided with equal intervals, at intermediate positions of attaching portions provided at three positions in the circumferential direction on the outer circumferential surface of the bearing bracket, in order to allow machining thereof by being held by a chuck of a machining apparatus. Furthermore, PTL 2 discloses a configuration in which chucking surfaces having parallel side surfaces and end surfaces are provided at two positions at intermediate positions of attaching boss portions which are provided at four positions on the outer circumference of a pump housing in order to enable machining by chucking the side surfaces.

Furthermore, PTL 3 discloses a configuration in which straight portions that allow a rotor to be chucked during machining are formed on the inner circumferences of openings in three tooth traces (tooth forms and hollow portions), provided with equal intervals at an angle of 120 degrees to one another, of a male screw rotor in order to allow these straight portions to be chucked by three chucking tools during machining.

CITATION LIST

Patent Literature

{PTL 1} Japanese Unexamined Utility Model Application, Publication No. S59-179462
{PTL 2} Japanese Patent No. 2686742
{PTL 3} Japanese Patent No. 3569044

SUMMARY OF INVENTION

Technical Problem

However, PTLs 1 to 3 merely disclose configurations in which chucking bases or chucking surfaces are provided on the outer circumference of the housing or the like, which is a workpiece of the machining, at positions where they are easy to be chucked to allow a chuck mechanism of apparatus for machining in order to hold these chucking portions for machining.

Simply chucking the chucking portions of a workpiece with a chuck mechanism of apparatus for machining and machining the workpiece inevitably causes deformation and strain due to chucking or deformation due to the centrifugal force caused when a housing having mounting legs or the like on the outer circumferential surface is rotated during machining. Accordingly, it is essential to selectively set the chucking portions to minimize deformation and strain.

More specifically, to improve the machining accuracy, it is important to minimize the deformation and strain due to chucking during machining or the deformation due to the centrifugal force, and it is no exaggeration to say that the level of machining accuracy depends on the settings of the chucking portions. Furthermore, to improve the quality of housings in order to further improve the accuracy and performance of products using the housings, the machining accuracy is becoming a critical factor, and measures therefor are needed.

The present invention is made in view of the above-described circumstances, and an object thereof is to provide a high-quality housing machined with high machining accuracy, which is achieved by minimizing deformation and strain due to chucking during machining of a cylindrical housing or deformation due to centrifugal force, as well as to provide a method of manufacturing the same.

Solution to Problem

To overcome the above-described problems, a housing and a method of manufacturing the same of the present invention employ the following solutions.

A cylindrical housing according to a first aspect of the present invention includes a bearing-member mounting portion which is provided at at least one position on an inner circumferential surface of the housing and on which a bearing member is mounted; mounting legs provided at at least two vertical positions on an outer circumferential surface of the housing; and chucking portions to be chucked by a chuck mechanism of a machining apparatus during machining, the chucking portions being provided on the outer circumferential surface of the housing at at least three positions in the circumferential direction, the three positions corresponding to a position where the bearing-member mounting portion is provided.

According to the first aspect of the present invention, the chucking portions to be chucked by a chuck mechanism of a machining apparatus during machining are provided at at least three positions, in the circumferential direction, on the outer circumferential surface of the cylindrical housing having the bearing-member mounting portion, the three positions are corresponding to the position where the bearing-member mounting portion is provided. Hence, when the housing is machined, it is possible to chuck the chucking portions provided at at least three positions on the outer circumferential surface, which are corresponding to the position where the bearing-member mounting portion is provided on the inner circumference and where the stiffness is relatively high, with, for example, the jaws of a chuck mechanism of a machining apparatus, such as a lathe, for machining. Accordingly, it is possible to manufacture a high-quality housing machined with high machining accuracy, which is achieved by minimizing the deformation and strain of the housings due to chucking.

In the housing according to a second aspect of the present invention, in the above-described housing, the chucking portions are formed of chucking bases which are formed on cylindrical surface integrally formed on the outer circumferential surface of the housing.

According to the second aspect of the present invention, the chucking portions are formed of chucking bases, which are formed on a cylindrical surface integrally formed on the outer circumferential surface of the housing. Hence, by chucking the chucking bases, which are formed on the cylindrical surface integrally formed on the outer circumferential surface, with a chuck mechanism of a machining apparatus, it is possible to chuck the housing without displacement or undesirable gaps and to perform machining. Accordingly, it is possible to manufacture housings with high machining accuracy by minimizing deformation, strain, or machining errors of the housings due to chucking.

In the housing according to a third aspect of the present invention, in any one of the above-described housings, the chucking portions are provided on the outer circumferential surface of the housing with equal intervals in the circumferential direction.

According to the third aspect of the present invention, the chucking portions are provided on the outer circumferential surface of the housing with equal intervals in the circumferential direction. Thus, it is possible to fix and machine the housing by chucking the chucking portions, which are provided at at least three positions with equal intervals in the circumferential direction of the cylindrical housing, with a chuck mechanism of a machining apparatus such that the three positions balance one another without displacement or undesirable gap. Accordingly, it is possible to improve the machining accuracy by equalizing and minimizing the deformation and strain of the housing due to chucking.

In the housing according to a fourth aspect of the present invention, in any one of the above-described housings, the mounting legs provided at the two vertical positions are provided as a pair of mounting legs and provided on a vertical axis perpendicular to the axial direction of the cylindrical housing, and one of the chucking portions which are provided at at least three positions in the circumferential direction on the outer circumferential surface of the housing is located on the vertical axis.

According to the fourth aspect of the present invention, the mounting legs provided at two vertical positions are provided as a pair on the vertical axis perpendicular to the axial direction of the cylindrical housing, and one of the chucking portions provided at at least three positions in the circumferential direction on the outer circumferential surface of the housing is located on the vertical axis. Thus, it is possible to cancel the deformation due to the centrifugal force caused by rotating the housing having the mounting legs at two vertical positions by means of the deformation due to chucking by a chuck mechanism of a machining apparatus at three positions0, thereby minimizing deformation of the housing during machining. Accordingly, it is possible to improve the machining accuracy of the housing and to manufacture a high-quality housing having less deformation or strain.

In the housing according to a fifth aspect of the present invention, in any one of the above-described housings, the housing is an electric compressor housing that constitutes an outer shell of an electric compressor.

According to the fifth aspect of the present invention, the housing is an electric compressor housing that constitutes an outer shell of an electric compressor. Thus, an electric compressor housing that constitutes an outer shell of an electric compressor can be made as a housing machined with high machining accuracy with minimum deformation or strain during machining. Accordingly, by incorporating an electric compression mechanism into a housing machined with high machining accuracy, it is possible to manufacture high-accuracy and high-performance electric compressors with few assembly errors.

In the housing according to a sixth aspect of the present invention, the above-described housing further includes fastening flange portions to be fastened to a third housing, wherein the fastening flange portions are integrally formed on both sides of the pair of mounting legs provided at the two vertical positions.

According to the sixth aspect of the present invention, fastening flange portions to be fastened to a third housing are integrally formed on both sides of the pair of mounting legs provided at two vertical positions. Hence, the fastening flange portions to be fastened to the third housing and the mounting legs are provided in the same direction. By means of these components which cancel the deformation due to the centrifugal force caused when rotating the housing by means of the deformation due to chucking by a chuck mechanism of a machining apparatus at three positions, it is possible to minimize the deformation of the housing during machining. In this way, it is possible to improve the machining accuracy of the housing and also it is possible to manufacture a high-quality housing having less deformation or strain.

In the housing according to a seventh aspect of the present invention, any one of the above-described housings further includes a refrigerant-gas intake port integrally formed so as to adjoin the upper mounting leg of the mounting legs which are provided at the two vertical positions.

According to the seventh aspect of the present invention, a refrigerant-gas intake port is integrally formed so as to adjoin the upper mounting leg of the mounting legs provided at two vertical positions. Hence, the refrigerant intake port and the mounting legs are provided in the same direction. By means of these components which cancel the deformation due to the centrifugal force caused when rotating the housing by means of the deformation due to chucking by a chuck mechanism of a machining apparatus at three positions, it is possible to minimize the deformation of the housing during machining. Also in this way, it is possible to improve the machining accuracy of the housing and to manufacture a high-quality housing having less deformation or strain.

Furthermore, a method of manufacturing a housing according to an eighth aspect of the present invention includes, chucking the chucking portions with a chuck mechanism of a machining apparatus when machining the housing according to any one of Claims 1 to 7; and machining a necessary portion while rotating the housing.

According to the eighth aspect of the present invention, when machining any one of the above-described housings, the chucking portions are chucked with a chuck mechanism of a machining apparatus, and a necessary portion is machined while rotating the housing, whereby the housing is manufactured. Hence, when a housing is machined, it is possible to chuck the chucking portions provided at at least three positions on the outer circumferential surface, which are corresponding to the position where the bearing-member mounting portion is provided on the inner circumference and where the stiffness is relatively high, with a chuck mechanism of a machining apparatus, such as a lathe, and to machine a necessary portion while rotating the housing. Accordingly, it is possible to manufacture a high-quality housing machined with high machining accuracy, which is achieved by minimizing the deformation and strain of the housings due to chucking.

Advantageous Effects of Invention

According to the present invention, when the housing is machined, it is possible to machine the housing by chucking the chucking portions provided at at least three positions on the outer circumferential surface, which are corresponding to the position where the bearing-member mounting portion is provided on the inner circumference and where the stiffness is relatively high, by using, for example, the jaws of a chuck mechanism of a machining apparatus, such as a lathe. Accordingly, it is possible to manufacture a high-quality housing machined with high machining accuracy, which is achieved by minimizing the deformation and strain of the housings due to chucking.

DESCRIPTION OF EMBODIMENTS

An embodiment of the present invention will be described with reference to FIGS. 1 to 6.

Figure 1:
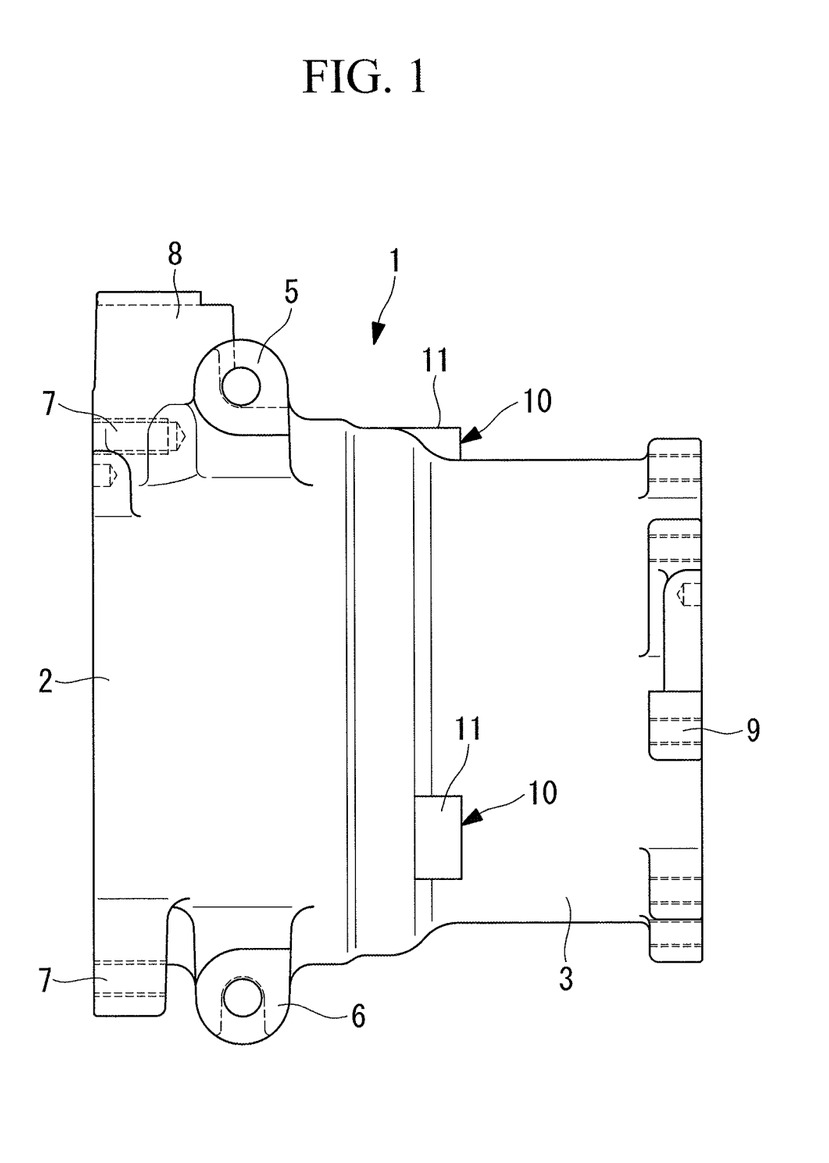
FIG. 1 is a side view of an electric compressor housing according to an embodiment of the present invention.
Figure 2:
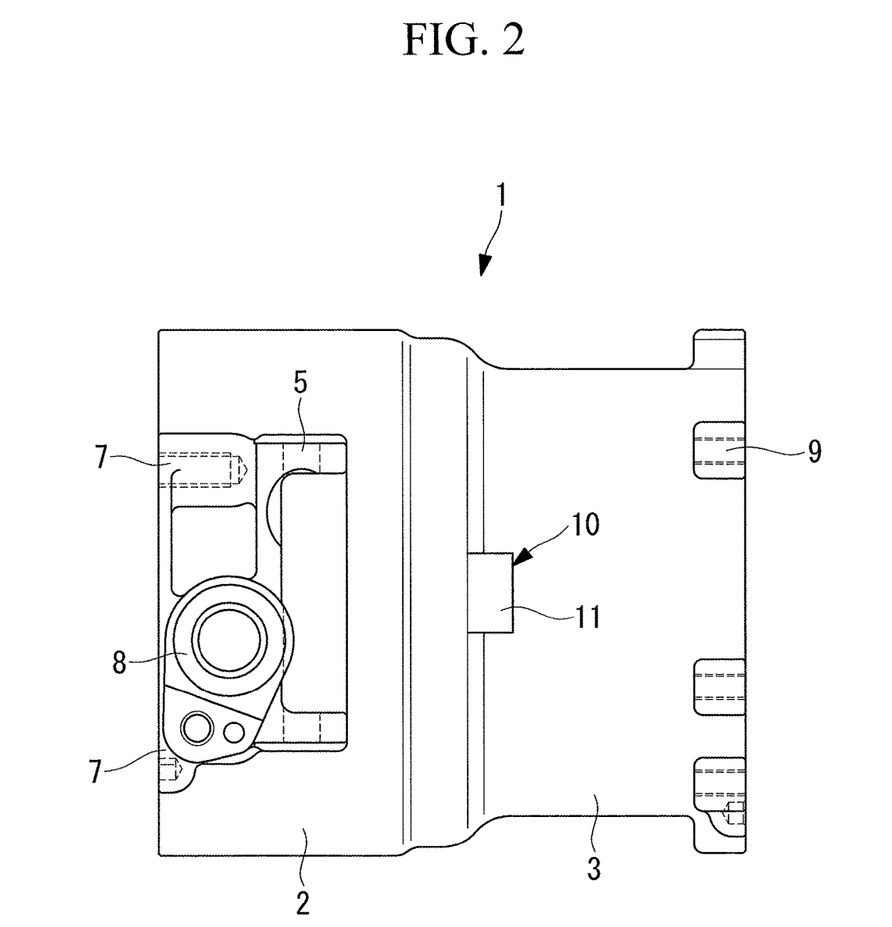
FIG. 2 is a plan view of the housing shown in FIG. 1.
Figure 3:
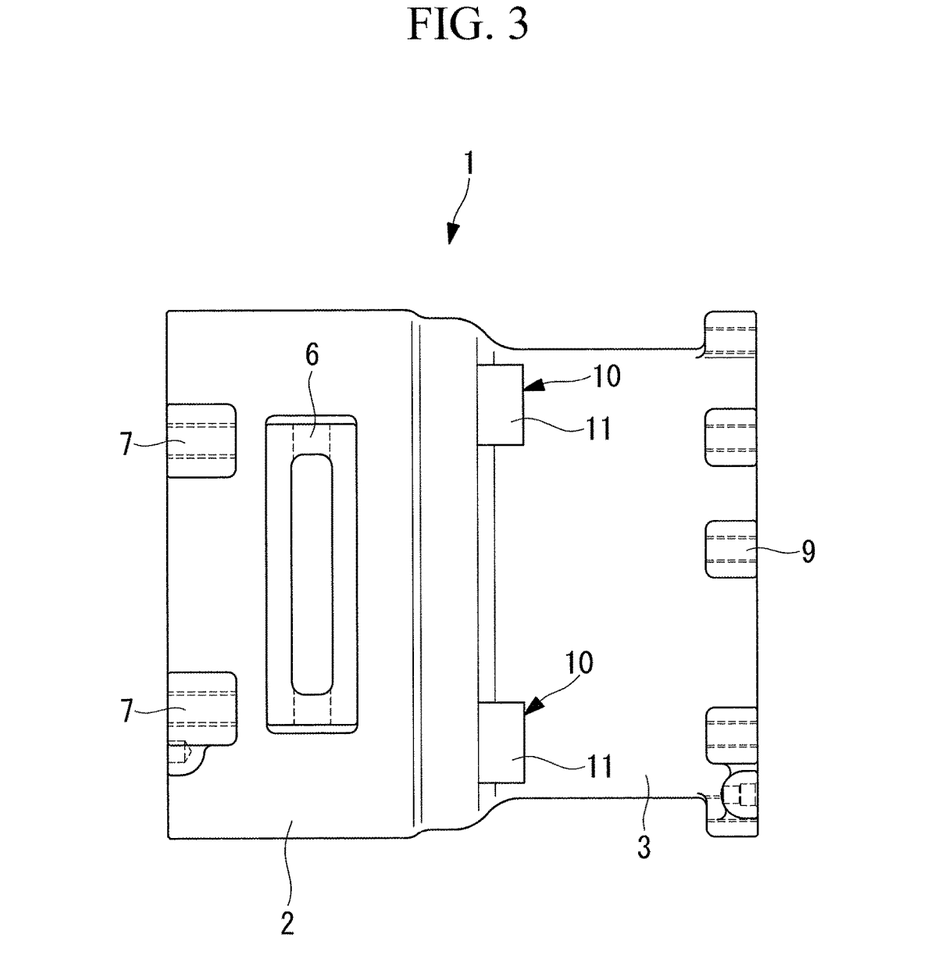
FIG. 3 is a bottom view of the housing shown in FIG. 1.
Figure 4:
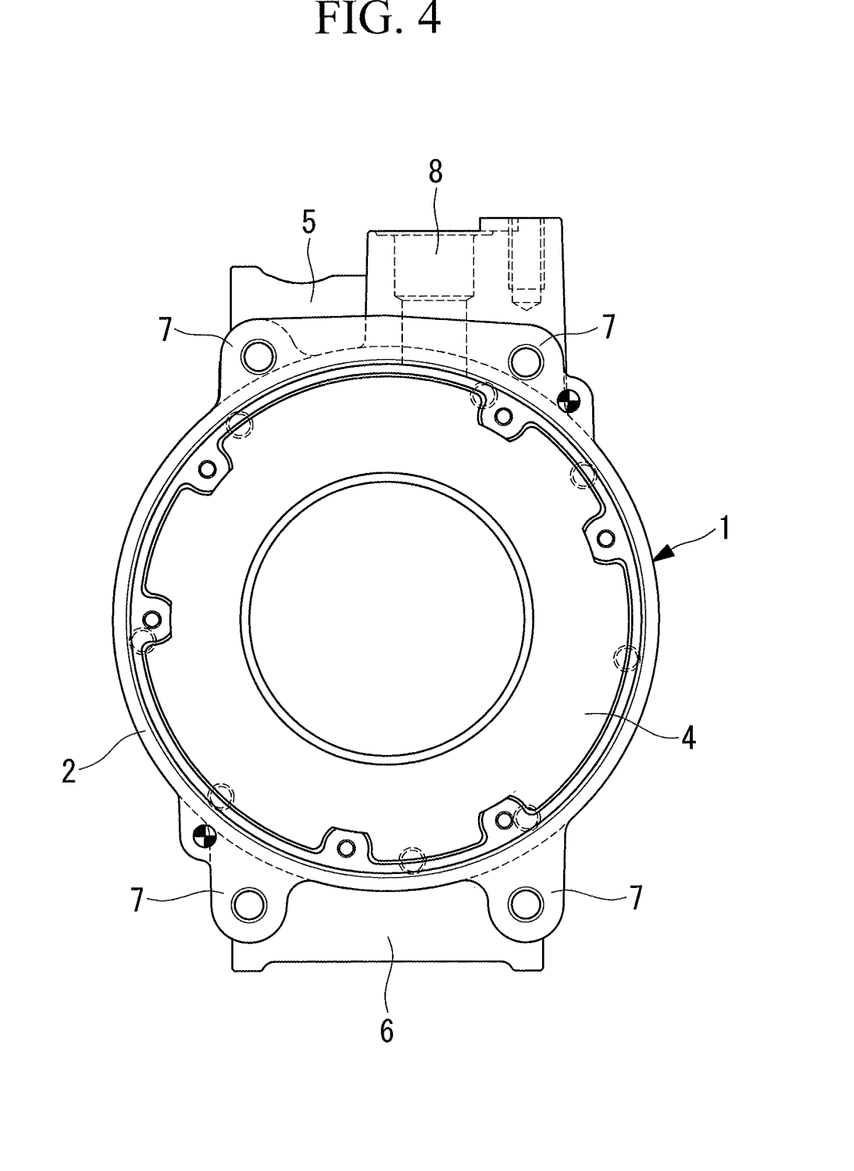
FIG. 4 is a left side view of the housing shown in FIG. 1.
Figure 5:
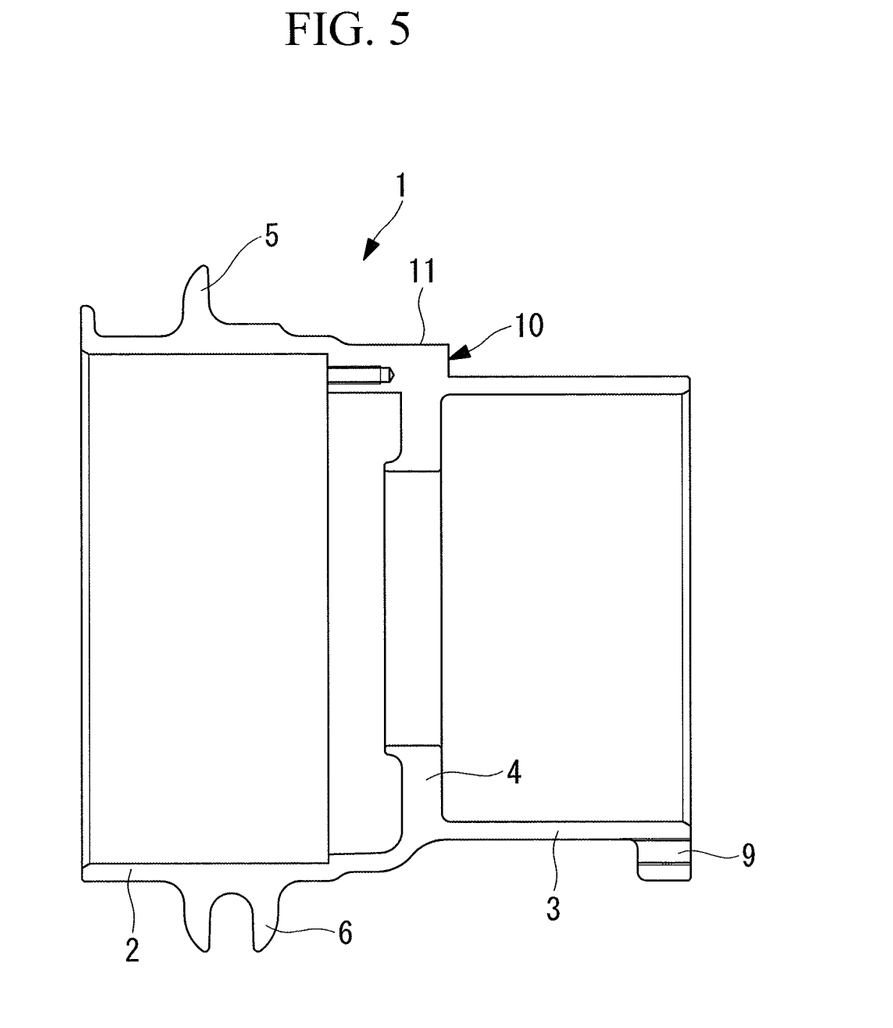
FIG. 5 is a view equivalent to a vertical cross-section of the housing shown in FIG. 1.
Figure 6:
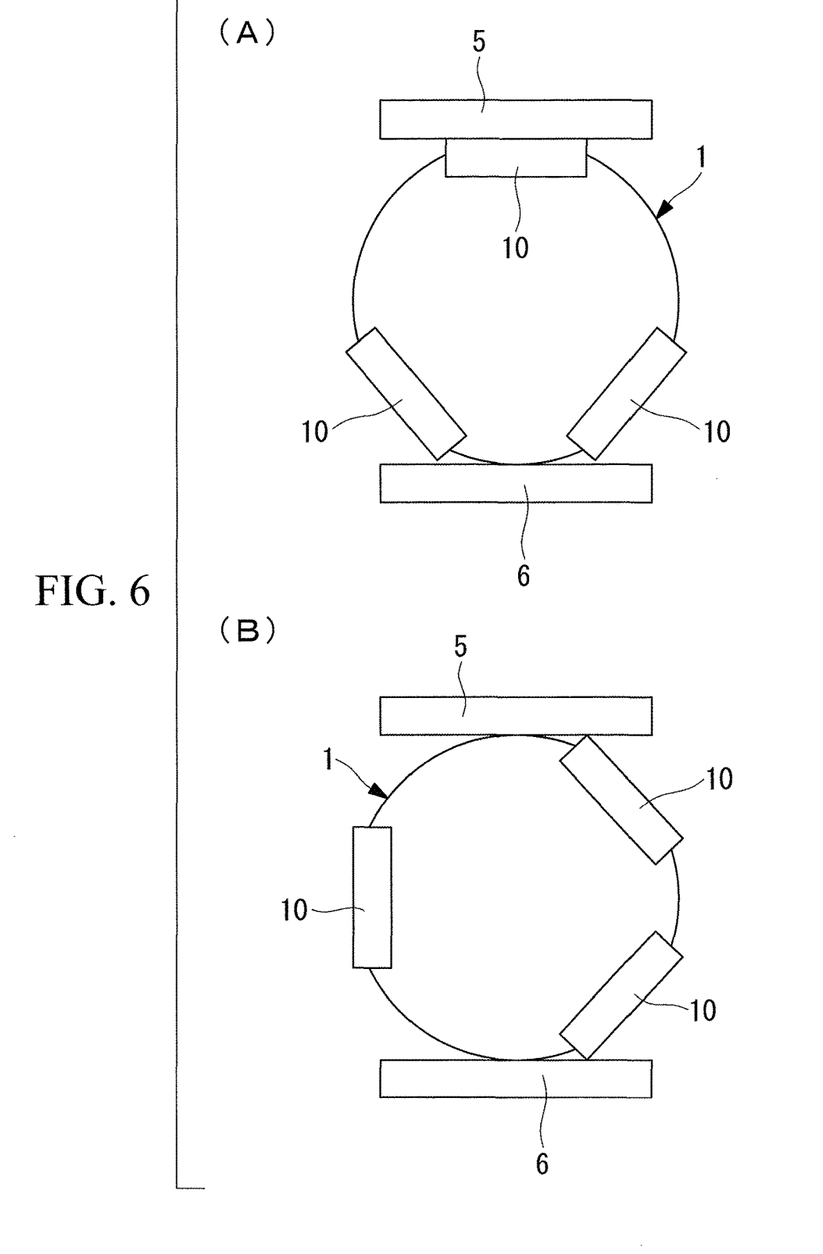
FIGS. 6A and 6B are schematic views showing the positional relationship between mounting legs and chucking portions provided on the outer circumferential surface of the housing shown in FIG. 1.

FIG. 1 is a side view of an electric compressor housing according to an embodiment of the present invention, FIG. 2 is a plan view of the housing, FIG. 3 is a bottom view of the housing, FIG. 4 is a left side view of the housing, FIG. 5 is a view equivalent to a vertical cross-section of the housing, and FIGS. 6A and 6B are schematic views showing the positional relationship between mounting legs and chucking portions.

An electric compressor housing (housing) 1 of this embodiment is a cylindrical housing that is formed of an aluminum alloy and constitutes an outer shell of an electric compressor, in which a motor housing portion 2, which has a larger diameter and accommodates a motor, and a compressor housing portion 3, which has a smaller diameter and accommodates a compression mechanism, are integrally formed by die casting.

As illustrated in FIG. 5, the housing 1 has, on the inner circumferential surface thereof, an integrally formed bearing-member mounting portion 4 on which a bearing member for rotatably supporting a driving shaft and for incorporating a compression mechanism is mounted. In the drawing, the left side of the bearing-member mounting portion 4 is the motor housing portion 2, and the right side is the compressor housing portion 3. The motor housing portion 2 and the compressor housing portion 3 accommodate the motor and the compression mechanism (not shown), respectively. Furthermore, a pair of mounting legs 5 and 6 are provided at two vertical positions on the outer circumferential surface of the motor housing portion 2 of the housing 1, so as to be located on a vertical axis perpendicular to the axial direction of the housing 1.

Furthermore, fastening flange portions 7 to be fastened to a third housing, namely, an inverter accommodating housing (not shown), are integrally formed on the outer circumferential surface of the motor housing portion 2, so as to be located at an end face of the housing, at both sides of the pair of mounting legs 5 and 6 provided at the top and bottom (that is, the fastening flange portions 7 are provided at four positions in total: two positions at the top and two positions at the bottom). A refrigerant-gas intake port 8 is integrally formed adjacent to the mounting leg 5 at the top. On the other hand, a plurality of fastening flange portions 9 to be fastened to a third housing, namely, a discharge housing (not shown), are provided with equal intervals on the outer circumferential surface of the compressor housing portion 3, so as to be located at an end face of the housing.

Furthermore, chucking portions 10, via which a chuck mechanism of a lathe chucks the housing 1 when the inner circumferential surface of the housing 1 is milled with a machining apparatus, such as a lathe, are provided at at least three positions on the outer circumferential surface of the housing 1, with equal intervals in the circumferential direction. These chucking portions 10, provided at at least three positions, are provided on a part of the outer circumferential surface, which is corresponding to the position where the bearing-member mounting portion 4 is provided and where the stiffness is relatively high due to the provision of the bearing-member mounting portion 4 on the inner circumferential surface.

In this case, the chucking portions 10 are formed of bases (chucking bases) 11, which are flat surfaces formed on cylindrical surface integrally formed on the outer circumferential surface of the housing 1. Furthermore, as illustrated in FIGS. 6A and 6B, the chucking portions 10 (chucking bases 11) provided at three positions in the circumferential direction are provided with equal intervals on the part of the outer circumferential surface, which is corresponding to the position where the bearing-member mounting portion 4 is provided on the inner circumferential surface. When the pair of mounting legs 5 and 6 are provided at two vertical positions on the vertical axis, as in this embodiment, it is desirable that one of the chucking portions 10 be provided on the vertical axis common to the mounting legs 5 and 6, as illustrated in FIG. 6A.

This is to minimize the deformation occurring during machining and improve the machining accuracy by canceling the deformation in the centrifugal direction by mans of the deformation due to chucking by a chuck mechanism in order to suppress, as much as possible, the deformation in the centrifugal direction caused by the provision of the mounting legs 5 and 6, when rotating the housing 1 about the axis thereof during machining.

With the above-described configuration, this embodiment provides the following advantages.

When the inner circumferential surface of the housing 1 is milled with a machining apparatus, such as a lathe, it is possible to machine the inner circumferential surface by chucking the chucking portions 10 (chucking bases 11) provided at three positions, in the circumferential direction, on the outer circumferential surface of the housing 1 with a chuck mechanism of the lathe and by rotating the housing 1 serving as a workpiece. At this time, because it is possible to chuck the portion of the housing 1 where the bearing-member mounting portion 4 is provided and where the stiffness is relatively high, the deformation and strain due to chucking can be reduced as much as possible.

Furthermore, although the deformation, in the centrifugal direction, of the top and bottom portions, where the mounting legs 5 and 6 are provided, due to the centrifugal force generated by rotating the housing 1 is larger than the other portions, because one of the chucking portions 10 provided at three positions in the circumferential direction is provided on the vertical axis common to the mounting legs 5 and 6, the deformation due to the centrifugal force can be cancelled with the deformation due to chucking by a chuck mechanism of a machining apparatus at the three positions. Accordingly, deformation which occurs during machining of the housing 1 can be suppressed to the minimum.

As has been described above, in this embodiment, the chucking portions 10 (chucking bases 11) to be chucked by a chuck mechanism of a machining apparatus are provided at at least three positions, in the circumferential direction, on the outer circumferential surface of the cylindrical housing 1 having the bearing-member mounting portion 4 so that the positions of the chucking portions 10 correspond to the position where the bearing-member mounting portion 4 is provided. Accordingly, when machining the housing 1, it is possible to chuck the chucking portions 10 provided at at least three positions on the outer circumferential surface, which are corresponding to the position where the bearing-member mounting portion 4 is provided on the inner circumferential surface and where the stiffness is relatively high, with a chuck mechanism of a machining apparatus, such as a lathe. Accordingly, it is possible to minimize the deformation and strain of the housing 1 due to chucking, and is is also possible to manufacture a high-quality housing 1 machined with high machining accuracy.

Furthermore, the chucking portions 10 are formed of the chucking bases 11, which are the flat surfaces formed on the cylindrical surface provided on the outer circumference of the housing 1. Hence, by chucking the chucking bases 11, which are the flat surfaces formed on the cylindrical surface integral with the outer circumferential surface, with a chuck mechanism of a machining apparatus, it is possible to chuck and machine the housing 1 without displacement or undesirable gaps. Accordingly, it is possible to manufacture a housing 1 machined with high machining accuracy, which is achieved by minimizing the deformation, strain, or a machining error of the housing 1 due to chucking.

Furthermore, the chucking portions 10 are provided on the outer circumferential surface of the housing 1 with equal intervals in the circumferential direction. Thus, it is possible to fix to machine the housing 1 by chucking the chucking portions 10 provided at at least three positions with equal intervals in the circumferential direction of the cylindrical housing 1, with a chuck mechanism of a machining apparatus, such that the three positions balance one another without displacement or undesirable gaps. Accordingly, it is possible to improve the machining accuracy by equalizing and minimizing the deformation and strain of the housing 1 due to chucking.

Furthermore, in this embodiment, the mounting legs 5 and 6 provided at two vertical positions are provided as a pair on the vertical axis perpendicular to the axial direction of the cylindrical housing 1, and one of the chucking portions 10, which are provided at at least three positions on the outer circumferential surface of the housing 1 with equal intervals in the circumferential direction, is located on this vertical axis. Thus, it is possible to cancel the deformation due to the centrifugal force caused by rotating the housing 1 having the mounting legs 5 and 6 at two vertical positions by means of the deformation due to chucking by a chuck mechanism of a machining apparatus at three positions, and hence, it is possible to minimize the deformation of the housing during machining. Accordingly, it is possible to improve the machining accuracy of the housing 1 and also it is possible to manufacture a high-quality housing 1 having less deformation or strain.

Furthermore, in this embodiment, the housing 1 is an electric compressor housing 1, which constitutes an outer shell of an electric compressor. Thus, the electric compressor housing 1, which constitutes an outer shell of an electric compressor, can be made as a housing 1 machined with high machining accuracy with minimum deformation or strain during machining. Accordingly, by incorporating an electric compression mechanism into a housing 1 machined with high machining accuracy, it is possible to manufacture a high-accuracy, high-performance electric compressor having reduced assembly errors.

Furthermore, the fastening flange portions 7 to be fastened to the third housing are integrally formed on both sides of the pair of mounting legs 5 and 6 provided at two vertical positions, and the refrigerant-gas intake port 8 is integrally formed adjacent to the mounting leg 5 provided at the top. Hence, the fastening flange portions 7 to be fastened to the third housing, the intake port 8, and the mounting legs 5 and 6 are provided in the same direction. By means of these components canceling the deformation due to the centrifugal force caused when rotating the housing 1 having these components by means of the deformation due to chucking with a chuck mechanism of a machining apparatus at three positions, it is possible to minimize the deformation of the housing during machining. In this way, it is possible to improve the machining accuracy of the housing 1 and also it is possible to manufacture a high-quality housing 1 having less deformation or strain.

Furthermore, when machining the housing 1, the chucking portions 10 (chucking bases 11) are chucked with a chuck mechanism of a machining apparatus, and the necessary portions are machined while rotating the housing 1, whereby the housing 1 is manufactured. Accordingly, when machining the housing 1, it is possible to chuck the chucking portions 10 provided at at least three positions on the outer circumferential surface, which are corresponding to the position where the bearing-member mounting portion 4 is provided on the inner circumference and where the stiffness is relatively high, with a chuck mechanism of a machining apparatus, such as a lathe, and to machine the necessary portions while rotating the housing 1. Accordingly, also with the method of manufacturing a housing according to this embodiment, it is possible to manufacture a high-quality housing 1 machined with high machining accuracy, which is achieved by minimizing the deformation and strain of the housing 1 due to chucking.

Note that the present invention is not limited to the invention according to the above-described embodiment, and may be appropriately modified without departing from the scope thereof. For example, although an example in which the chucking bases 11, which are formed of the flat surfaces formed on the cylindrical surfaces and serving as the chucking portions 10, are provided on the outer circumferential surface of the housing 1 has been described in the above embodiment, the chucking bases 11 are not necessarily needed. As long as the chucking portion 10 is flat surfaces on a smooth cylindrical surface, the outer circumferential surface of the housing 1 itself may be used as the chucking portion 10. The present invention covers such a configuration.

Furthermore, although an example of a three-segment type housing, in which an inverter accommodating housing and a discharge housing, serving as third housings, are fastened to both ends of the housing 1 has been described in the above embodiment, the housing is not limited thereto, and the present invention may of course be equally applied to two-segment type housings or other housings.

Furthermore, although an example case where the housing 1 is chucked at three positions, in the circumferential direction, on the outer circumference has been described in the above embodiment, the number of positions is not necessarily limited to three, but may be any number larger than three. There are various possible modifications, such as chucking at six positions by three chucks each having two jaws.

REFERENCE SIGNS LIST 1 electric compressor housing (housing)
2 motor housing portion
3 compressor housing portion
4 bearing-member mounting portion
5, 6 mounting leg
7 fastening flange portion
8 intake port
10 chucking portion
11 chucking base

The invention claimed is:

1. A cylindrical housing comprising:
   a bearing-member mounting portion which is provided at at least one position on an inner circumferential surface of the housing and on which a bearing member is mounted;
   mounting legs provided at at least two vertical positions on an outer circumferential surface of the housing; and
   chucking portions to be chucked by a chuck mechanism of a machining apparatus during machining, the chucking portions being provided on the outer circumferential surface of the housing at at least three positions in the circumferential direction, the at least three positions corresponding to a position where the bearing-member mounting portion is provided.

2. The housing according to claim 1, wherein the housing is an electric compressor housing that constitutes an outer shell of an electric compressor.

3. The housing according to claim 2, further comprising fastening flange portions to be fastened to a third housing, wherein the fastening flange portions are integrally formed on both sides of the pair of mounting legs provided at the at least two vertical positions.

4. The housing according to claim 2, further comprising a refrigerant-gas intake port integrally formed so as to adjoin the upper mounting leg of the pair of mounting legs which are provided at the at least two vertical positions.

5. The housing according to claim 1, wherein the chucking portions are formed of chucking bases which are formed on a cylindrical surface integrally formed on the outer circumferential surface of the housing.

6. The housing according to claim 1, wherein the chucking portions are provided on the outer circumferential surface of the housing with equal intervals in the circumferential direction.

7. The housing according to claim 1, wherein
   the mounting legs provided at the two vertical positions are provided as a pair of mounting legs and provided on a vertical axis perpendicular to the axial direction of the cylindrical housing, and
   one of the chucking portions which are provided at the least three positions in the circumferential direction on the outer circumferential surface of the housing is located on the vertical axis.

8. A method of manufacturing a housing comprising:
   chucking the chucking portions with a chuck mechanism of a machining apparatus when machining the housing according to claim 1; and
   machining a necessary portion while rotating the housing.

* * * * *